(12) United States Patent
El-saidny

(10) Patent No.: US 8,767,599 B2
(45) Date of Patent: *Jul. 1, 2014

(54) SYSTEMS AND METHODS FOR DOWNLINK OUTER LOOP POWER CONTROL FOR HSUPA

(75) Inventor: Mohamed A. El-saidny, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 576 days.

This patent is subject to a terminal disclaimer.

(21) Appl. No.: 12/546,380

(22) Filed: Aug. 24, 2009

(65) Prior Publication Data

US 2011/0044263 A1    Feb. 24, 2011

(51) Int. Cl.
*G04C 17/00* (2006.01)
(52) U.S. Cl.
USPC ........... 370/311; 370/318; 370/341; 455/522; 455/69; 455/67
(58) Field of Classification Search
USPC ......... 370/329, 332, 333, 229, 230, 253, 341, 370/252, 318, 311, 328; 455/522, 69, 455/67.11, 517, 419
See application file for complete search history.

(56) References Cited

U.S. PATENT DOCUMENTS

| 6,748,234 | B1 | 6/2004 | Agrawal et al. | |
|---|---|---|---|---|
| 2008/0261530 | A1* | 10/2008 | Gerstenberger et al. | 455/63.1 |
| 2009/0190485 | A1* | 7/2009 | Bjorkegren et al. | 370/252 |
| 2009/0280822 | A1* | 11/2009 | Ericson et al. | 455/452.2 |
| 2010/0235704 | A1* | 9/2010 | Gunnarsson et al. | 714/748 |
| 2010/0296422 | A1* | 11/2010 | Ericson et al. | 370/310 |

FOREIGN PATENT DOCUMENTS

| EP | 1517456 A1 | 3/2005 |
|---|---|---|
| TW | 554630 B | 9/2003 |

OTHER PUBLICATIONS

International Search Report—PCT/US2010/046509—ISA/EPO—Feb. 3, 2011.
Taiwan Search Report—TW099128318—TIPO—Jun. 13, 2013.
Written Opinion—PCT/US2010/046509—ISA/EPO—Feb. 3, 2011.

* cited by examiner

*Primary Examiner* — Dady Chery
(74) *Attorney, Agent, or Firm* — Darren M. Simon

(57) ABSTRACT

The described aspects relate to systems and methods for power control in wireless communication systems. In particular, the described aspects relate to dynamically providing, based on activities on HSUPA channels, a downlink power control adjustment during a data transmission from a user equipment device to a base station or node B device in a HSUPA communication system. The method determines a Signal-to-Interference Ratio (SIR) target for the Enhanced Transport Channel (E-DCH) based on a transmitter's logic that determines the required power level of the downlink grant control channels. This target can then apply to the final target determined on a plurality of other transport channels for the receiver to adjust the power of its downlink channels.

43 Claims, 9 Drawing Sheets

SYSTEMS AND METHODS FOR DOWNLINK OUTER LOOP POWER CONTROL FOR HSUPA

BACKGROUND

1. Field

The described aspects relate generally to systems and methods for power control in wireless communication systems. In particular, the described aspects relate to downlink outer loop power control in a wireless communication system.

2. Background

Cellular wireless communications systems generally comprise a number of radio transceivers, or base stations, that define service areas or cells. Cellular systems are designed specifically to accommodate a number of users of user equipment (UE) as the user moves around within the system. Thus, various UEs may interact with various base stations as users move through the system.

As the user moves throughout the system, power control may be used by the base station and/or the UE to ensure sufficient quality of service of signals received at the base station and/or the UE. Spread spectrum systems such as Code Division Multiple Access (CDMA) typically employ an open loop and/or closed loop power control scheme. In closed loop power control, the UE may actively participate in making power adjustments. Further, the closed loop power control typically has two loops: the inner-loop and the outer-loop. In one aspect, the inner-loop regularly measures the received signal quality at the base station and compares it to a target signal quality. This measurement may be performed on any channel or combination of channels that can be used as a power reference. For example, the UE may compare signals received from a given base station to a given threshold value, or quality of service value. Then, the base station may instruct the UE to increase or decrease transmit power based upon the comparison, to meet a signal quality target. On the other hand, the outer-loop regularly updates the signal quality target based on an estimate of the current decoding quality. For example, the outer-loop may increase the signal quality target by a first amount each time a frame is incorrectly decoded by the UE, and decrease the signal quality target by a second amount each time a frame is correctly decoded. In this manner, using the outer-loop, the UE may adjust the signal quality target for the inner-loop to a level at which a predetermined, acceptable quality of service is maintained.

Currently, in closed loop power control schemes, the current method of setting the signal quality target is based on the UE receiving data on the downlink. If the scenario occurs where all of the data being transmitted is on the uplink, however, the signal quality target may become outdated, e.g. during dormancy on the downlink channels. During such a scenario, the UE may experience lower quality of downlink and takes time to adapt to the actual channel conditions, creating performance issues and call drops for the UE during transmissions between the UE and the base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for dynamically controlling a base station downlink transmission power to user equipment (UE) in a High-Speed Uplink Packet Access (HSUPA) communication system. The method may include assigning a power indicator target to enhanced dedicated (E-DCH) uplink transport channel. The method may further include performing an outer loop computation having a first period, wherein the outer loop computation, includes: incrementing the power indicator of the E-DCH uplink transport channel based upon a first criteria; decrementing the power indicator of E-DCH uplink transport channel based upon a second criteria; and determining a maximum power indicator from the E-DCH uplink transport channel and the power indicators of each of the plurality of other transport channels. In addition, the method may include performing an inner loop computation having a second period, wherein the inner loop computation comprises making a power control decision based on the maximum power indicator.

Another aspect relates to at least one processor configured to dynamically control a base station downlink transmission power to user equipment (UE) in a High-Speed Uplink Packet Access (HSUPA) communication system. The processor may include a first module for assigning a power indicator target to enhanced dedicated (E-DCH) uplink transport channel. In addition, the processor may include a second module for performing an outer loop computation having a first period, wherein the outer loop computation, includes incrementing the power indicator of the E-DCH uplink transport channel based upon a first criteria; decrementing the power indicator of E-DCH uplink transport channel based upon a second criteria; and determining a maximum power indicator from the E-DCH uplink transport channel and the power indicators of each of the plurality of other transport channels. Further, the processor may include a third module for performing an inner loop computation having a second period, wherein the inner loop computation comprises making a power control decision based on the maximum power indicator.

Yet another aspect relates to a computer program configured to dynamically control a base station downlink transmission power to user equipment (UE) in a High-Speed Uplink Packet Access (HSUPA) communication system. The computer program may include a computer-readable medium including at least one instruction for causing a computer to assign a power indicator target to enhanced dedicated (E-DCH) uplink transport channel. The computer-readable medium may also include at least one instruction for causing a computer to perform an outer loop computation having a first period, wherein the outer loop computation, includes: incrementing the power indicator of the E-DCH uplink transport channel based upon a first criteria; decrementing the power indicator of E-DCH uplink transport channel based upon a second criteria; and determining a maximum power indicator from the E-DCH uplink transport channel and the power indicators of each of the plurality of other transport channels. In addition, the computer-readable medium may include at least one instruction for causing a computer to perform an inner loop computation having a second period, wherein the inner loop computation comprises making a power control decision based on the maximum power indicator.

Another aspect relates to an apparatus for dynamically controlling a base station downlink transmission power to user equipment (UE) in a High-Speed Uplink Packet Access (HSUPA) communication system. The apparatus may include means for assigning a power indicator target to enhanced dedicated (E-DCH) uplink transport channel. The apparatus may also include means for performing an outer loop computation having a first period, wherein the outer loop computation, includes: incrementing the power indicator of the E-DCH uplink transport channel based upon a first criteria; decrementing the power indicator of E-DCH uplink transport channel based upon a second criteria; and determining a maximum power indicator from the E-DCH uplink transport channel and the power indicators of each of the plurality of other transport channels. Further, the apparatus may include means for performing an inner loop computation having a second period, wherein the inner loop computation comprises making a power control decision based on the maximum power indicator.

Yet another aspect relates to an apparatus for dynamically controlling a base station downlink transmission power to user equipment (UE) in a High-Speed Uplink Packet Access (HSUPA) communication system. The apparatus may include a memory including a plurality of instructions, including instructions for assigning a power indicator target to enhanced dedicated (E-DCH) uplink transport channel, instructions for performing an outer loop computation having a first period, wherein the outer loop computation, includes incrementing the power indicator of the E-DCH uplink transport channel based upon a first criteria, decrementing the power indicator of E-DCH uplink transport channel based upon a second criteria, determining a maximum power indicator from the E-DCH uplink transport channel and the power indicators of each of the plurality of other transport channels, and instructions for performing an inner loop computation having a second period, wherein the inner loop computation comprises making a power control decision based on the maximum power indicator. The apparatus may also include a processor in communication with the memory and operable to execute the plurality of instructions.

Another aspect relates to a method for dynamically controlling a base station downlink transmission power to a user equipment (UE) in a High-Speed Uplink Packet Access (HSUPA) communication system. The method may include detecting a discontinuous data transmission corresponding to a valid uplink data transmission. Further, the method may also include determining that a difference between an Enhanced Uplink (EUL) downlink (DL) channel energy threshold and a detected energy of the corresponding EUL DL channel of the base station is greater than or equal to a signal quality target threshold due to a reduction in power of the EUL DL channel. Moreover, the method may include adjusting a signal interference ratio target EUL based on the determining, wherein the adjusting is to a level that increases a power of all EUL DL channels.

Still another aspect relates to at least one processor configured for dynamically controlling a base station downlink transmission power to a user equipment (UE) in a High-Speed Uplink Packet Access (HSUPA) communication system. The processor may include a first module for detecting a discontinuous data transmission corresponding to a valid uplink data transmission. The processor may also include a second module for determining that a difference between an Enhanced Uplink (EUL) downlink (DL) channel energy threshold and a detected energy of the corresponding EUL DL channel of the base station is greater than or equal to a signal quality target threshold due to a reduction in power of the EUL DL channel. In addition, the processor may include a third module for adjusting a signal interference ratio target EUL based on the determining, wherein the adjusting is to a level that increases a power of all EUL DL channels.

Another aspect relates to a computer program product configured to dynamically control a base station downlink transmission power to a user equipment (UE) in a High-Speed Uplink Packet Access (HSUPA) communication system. The computer program product may include a computer-readable medium including at least one instruction operable to cause a computer to detect a discontinuous data transmission corresponding to a valid uplink data transmission. Further, the computer-readable medium may also include at least one instruction operable to cause the computer to determine that a difference between an Enhanced Uplink (EUL) downlink (DL) channel energy threshold and a detected energy of the corresponding EUL DL channel of the base station is greater than or equal to a signal quality target threshold due to a reduction in power of the EUL DL channel. In addition, the computer-readable medium may include at least one instruction operable to cause the computer to adjust a signal interference ratio target EUL based on the determining, wherein the adjusting is to a level that increases a power of all EUL DL channels.

Yet another aspect relates to an apparatus configured for dynamically controlling a base station downlink transmission power to a user equipment (UE) in a High-Speed Uplink Packet Access (HSUPA) communication system. The apparatus may include means for detecting a discontinuous data transmission corresponding to a valid uplink data transmission. The apparatus may also include means for determining that a difference between an Enhanced Uplink (EUL) downlink (DL) channel energy threshold and a detected energy of the corresponding EUL DL channel of the base station is greater than or equal to a signal quality target threshold due to a reduction in power of the EUL DL channel. Additionally, the apparatus may include means for adjusting a signal interference ratio target EUL based on the determining, wherein the adjusting is to a level that increases a power of all EUL DL channels.

Another aspect relates to an apparatus for dynamically controlling a base station downlink transmission power to a user equipment (UE) in a High-Speed Uplink Packet Access (HSUPA) communication system. The apparatus may include a memory comprising a plurality of instructions, including instructions for detecting a discontinuous data transmission corresponding to a valid uplink data transmission, instructions for determining that a difference between an Enhanced Uplink (EUL) downlink (DL) channel energy threshold and a detected energy of the corresponding EUL DL channel of the base station is greater than or equal to a signal quality target threshold due to a reduction in power of the EUL DL channel, and instructions for adjusting a signal interference ratio target EUL based on the determining, wherein the adjusting is to a level that increases a power of all EUL DL channels. Further, the apparatus may also include a processor in communication with the memory and operable to execute the plurality of instructions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
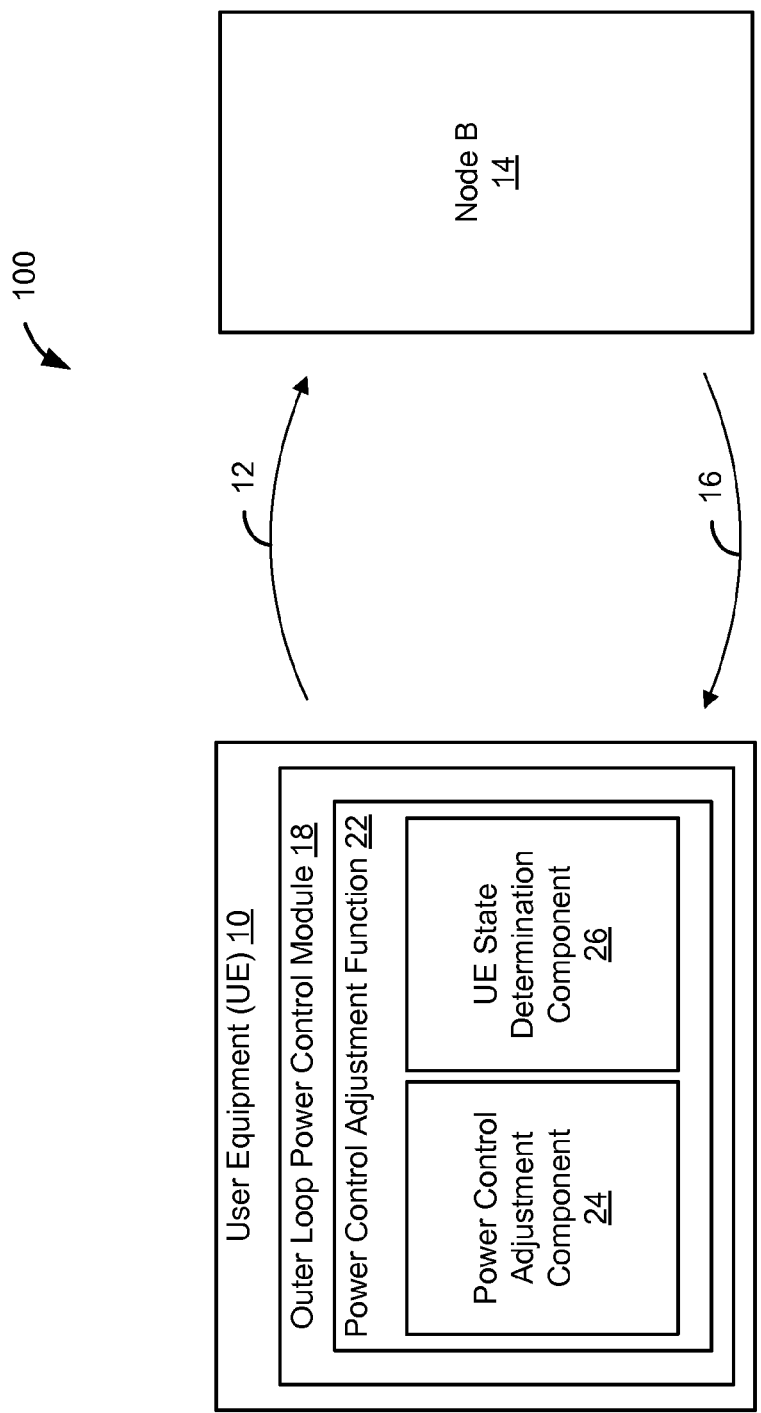
FIG. 1 is a schematic diagram illustrating a cellular wireless communication system in accordance with one aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques are described herein with respect to a High-Speed Uplink Packet Access (HSUPA) system. However, such techniques may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, HSUPA, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The schematic diagram in FIG. 1 illustrates a wireless communication system 100 in accordance with an aspect. System 100 may include one or more Node Bs 14, or base stations, that define service areas or cells. User equipment (UE) 10 may interact with each base station 14 via communication links 12 and 16 as UE 10 moves through system 100. Communication link 12 from UE 10 to base station 14 may be referred to as the uplink, while communication link 16 from base station 14 to UE 10 may be referred to as the downlink.

Uplink 12 and downlink 16 may include various channels for carrying data between UE 10 and base station 14 over a network. In an aspect, uplink 12 may include, for example, an enhanced uplink dedicated physical data channel (E-DPDCH) for carrying uplink data for the enhanced uplink dedicated channel (E-DCH) and an enhanced dedicated physical control channel (E-DPCCH) for control information associated with E-DPDCH, among other transport channels.

In an aspect, downlink 16 may include an Enhanced Dedicated Channel (E-DCH) absolute grant channel (E-AGCH) carrying a scheduler grant information from base station 14 to UE 10 indicating how much data may be transmitted over the network during a particular time for a particular bandwidth. Further, downlink 16 may include an E-DCH relative grant channel (E-RGCH) carrying a scheduler grant information from base station 14 to UE 10 notifying UE 10 whether to increase, decrease or maintain the current data transfer rate. Further, for example, downlink 16 may include an E-DCH Hybrid ARQ Indicator Channel (E-HICH) for carrying feedback from base station 14 to UE 10 indicating the status of the data transmission. For example, the E-HICH may send an acknowledgement (ACK) message indicating base station 14 received the data correctly, a negative acknowledgement (NACK) message indicating base station 14 received the data but incorrectly. In an aspect, in a predetermined time period (i.e. Transmission Time Interval or TTI), UE 10 can detect ACK (i.e. high positive energy on E-HICH), NACK (i.e. high negative energy on E-HICH), or DTX (i.e. energy of E-HICH is below that high positive energy and above that high negative energy). DTX usually indicate that there is no transmission received by base station As UE 10 moves through system 100 and communicates with base station 14, UE 10 may maintain a specific quality of service during data transfers between UE 10 and base station 14. In an aspect, a quality of service target may be provided to UE 10 by base station 14. For example, base station 14 may send UE 10 a signal-to-interference ratio (SIR) target defining a maximum percent of error, such as a block error rate (BLER), that UE 10 should maintain during data transfers. UE 10 may use an outer loop power control module 18 for adjusting the target SIR, correspondingly adjusting the transmission power of base station 14 on downlink 16. In other words, UE 10 requests power control adjustments based on measurements of downlink 16.

In an aspect, outer loop power control module 18 may set a signal-to-interference ratio (SIR) target indicating a target power level for data transmission by base station 14.

In an aspect, outer loop power control module 18 may include a power control adjustment function 22 operable for adjusting the SIR target for transmissions from base station 14 to UE 10. Power control adjustment function 22 may further include a UE state component 26 operable for identifying the current state of UE 10 and a power control adjustment component 24 operable for adjusting the SIR target, or a similar target power.

Figure 2:
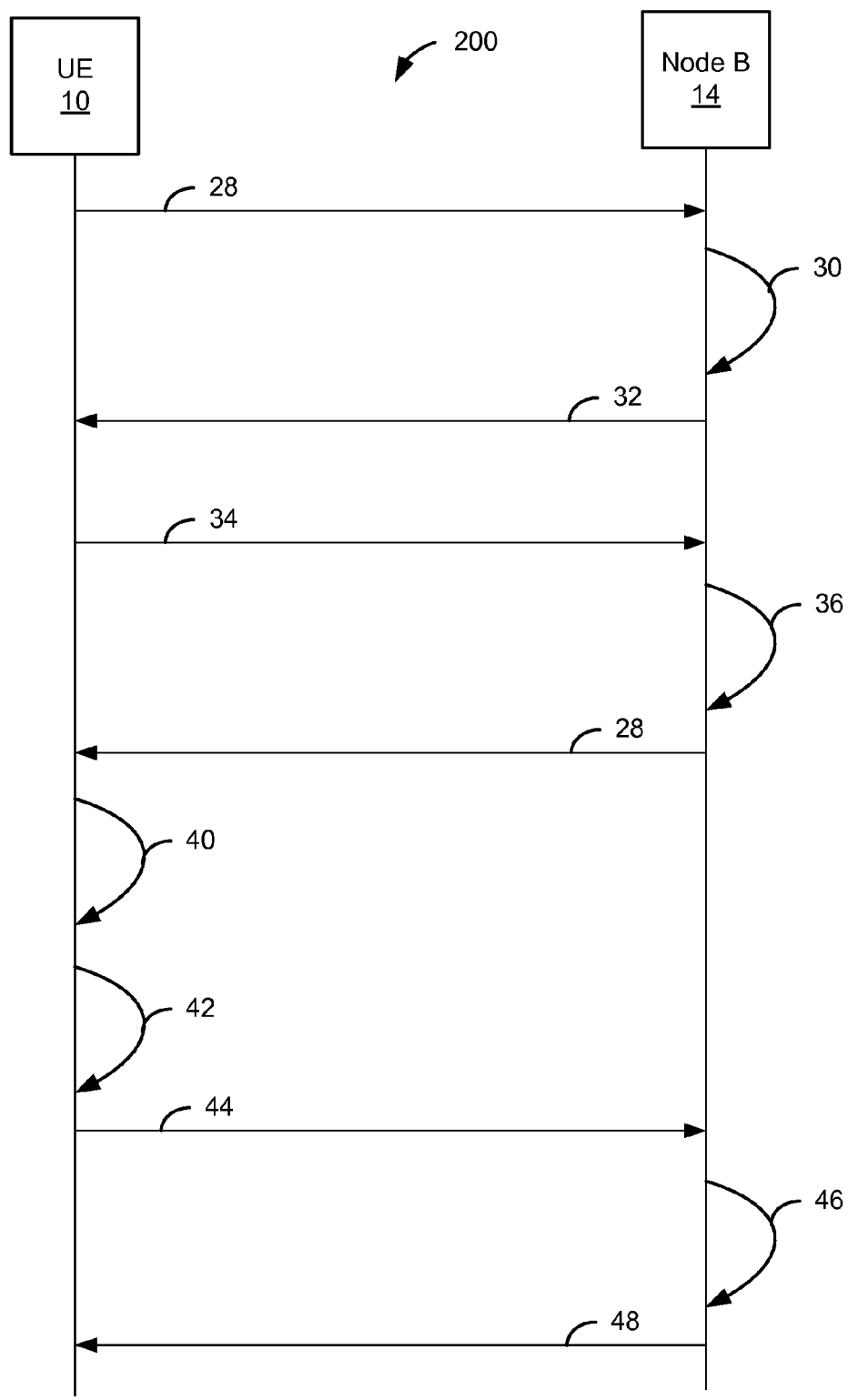
FIG. 2 is an illustration of an example methodology that facilitates data transmission in accordance with another aspect.

Turning now to FIG. 2, illustrated is an example methodology 200 that facilitates data transmission between UE 10 and base station 14 in accordance with an aspect. At 28, UE 10 may request a grant for transmission from base station 14, allowing UE 10 to transmit data on uplink 12 (FIG. 1). At 30, base station 14 determines whether to allow UE 10 to transmit data to base station 14. In an aspect, base station 14 may also determine the transmission power level, as well as the level of quality of service, such as a target SIR, for data transmissions between base station 14 and UE 10. Next, if base station 14 decides to allow UE 10 to transmit data to base station 14, base station 14 may send a grant message to UE 10. In particular, an E-AGCH channel may include the grant message indicating how much data during a period of time UE 10 may transmit to base station 14 and what power level may be used for the data transmission. Moreover, the grant message may include a traffic-to-pilot ratio ("T/P ratio") indicating the amount of power UE 10 is allowed to use for transmitting data on the uplink. The grant allocation mechanism can be considered as power control procedure. Once base station 14 grants UE 10 permission to transmit data, the grant may be valid until a new grant is issued or the existing grant is modified by a message received on the E-RGCH channel.

After receiving the grant message from base station 14, at 34, UE 10 may transmit data to base station 14 in accordance with the grant message. In an aspect, UE 10 may transmit data via the E-DPDCH channel. Further, the data transmission from UE 10 to base station 14 should be associated with control information transmitted on E-DPCCH, such as a happy bit. The happy bit may indicate whether UE 10 is happy with the grant provided by base station 14. For example, the happy bit may indicate whether UE 10 is happy with the grant allocated to UE 10 by base station 14 and whether UE 10 will be able to empty the UE buffer within the time configured, e.g. a Happy-Bit-Delay. At 36, base station 14 may decode the received data from UE 10. After decoding the received data, at 38, base station 14 may send feedback regarding receipt of the data via the E-HICH channel. For example, base station 14 may send either an ACK indicating the receipt of data correctly, a NACK indicating receipt of data but incorrectly. Alternatively, after a predetermined time, UE 10 may determine that the base station 14 has not received the data and thus decodes the E-HICH transmission as a discontinuous transmission (DTX), indicating no receipt of data. Further, for example, at 38, UE 10 may receive one or more physical layer messages, such as a message on an E-RGCH channel having information indicating whether UE 10 should increase, decrease or keep the current grant from base station 14. Additionally, for example, at 38, base station 14 may send a message with new data for receipt by UE 10. At 40, UE 10 receives one or any combination of messages received from BS 14, such as message(s) sent at 38, for determining an actual quality of service metric, such as a block error rate (BLER), relative to the quality of service target. The BLER may include the failure of base station 14 to receive data, as well as the failure of UE 10 to decode the feedback from base station 14. UE 10 may also determine the power level of the message/data transmission on the downlink from base station 14.

Next, at 42, in an aspect of outer loop power control, UE 10 may apply a power control adjustment function for adjusting the quality of service target, such as the SIR target. In an aspect, if the actual BLER is greater than or less than the target percent of error allowed for the data transmission, then the power control adjustment function may determine whether the signal quality target needs to be increased, decreased or remain the same. In an aspect, if the downlink power transmission is low, then UE 10 may miss feedback from base station 14 causing performance issues. Thus, in such a case, UE 10 may increase the SIR target for transmissions between UE 10 and base station 14. However, if the downlink power transmission is too high, then unnecessary power may be used during the transmissions between UE 10 and base station 14. Thus, in such a case, UE 10 may decrease the SIR target for transmissions between UE 10 and base station 14. At 44, UE 10 may send a power control command to base station 14 indicating whether the quality of service target needs to increase, decrease or remain the same. At 46, base station 14 may adjust the quality of service target, and hence adjust a downlink transmission power level, based upon the received power control command from UE 10. Next, at 48, base station 14 may set the new quality of service target and transmit a new message to UE 10 at the new downlink transmission power level.

Figure 3:
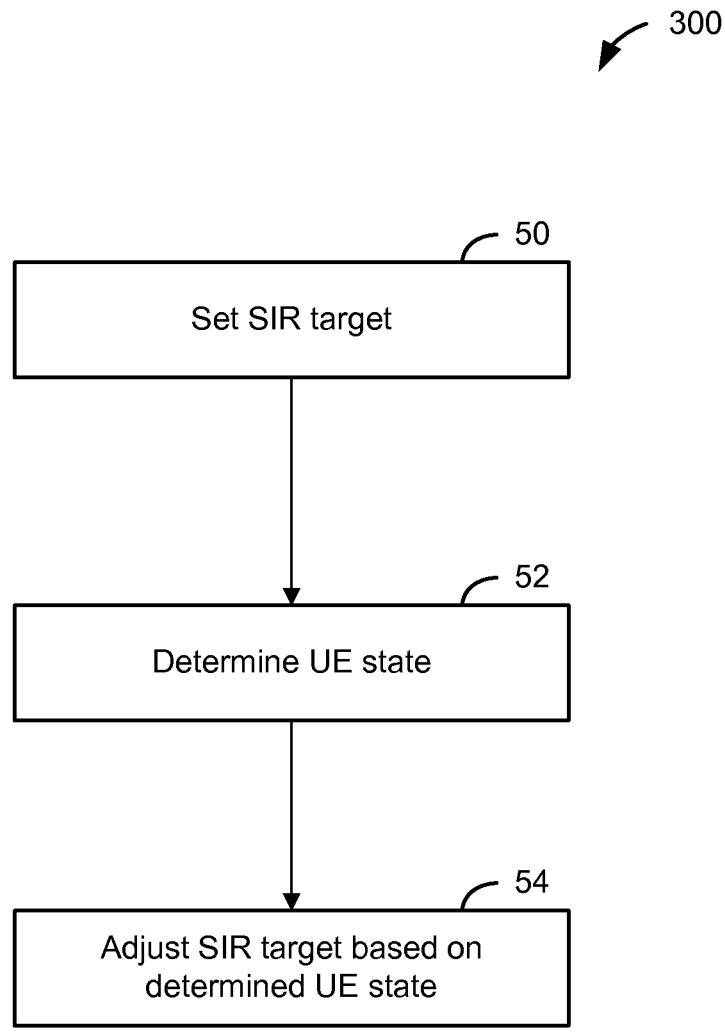
FIG. 3 is a flow chart illustrating an example power control adjusting function in accordance with yet another aspect.

Referring now to FIG. 3, illustrated is an exemplary flow chart 300 illustrating actions of high-level power control adjusting function 22 (FIG. 1) in accordance with an aspect. In step 50, power control adjusting function 22 sets an SIR target value for data transmission on the downlink from base station 14 (FIG. 1). Next, in step 52, power control adjusting function 22 determines the state of the UE. The UE state may include, for example, whether UE 10 receives an E-AGCH or E-RCGH grant from base station 14, whether UE 10 reports happy or unhappy in reply to the received grant from base station 14, and whether UE 10 detects DTX or NACK feedback from base station 14, among other UE states. In step 54, power control adjusting function 22 may adjust the SIR target based upon the determined UE state. Adjusting the SIR target may include increasing or decreasing the SIR target by a value. In an aspect, the value by which the SIR target is increased or decreased may be determined, for example, based upon the load of the network or the technical capabilities of base station 14 or UE 10, among other factors.

The SIR target may have a ceiling value representing a maximum value, and a floor value indicating a value the SIR target cannot go below. As discussed in U.S. Pat. No. 6,748,234, the entirety of which is incorporated by reference herein, the SIR target floor and ceiling can control the range in which the transmit NodeB power may vary. As indicated in 3GPP 25.214, For DPCH, the relative transmit power offset between DPCCH fields and DPDCHs is determined by the network. The TFCI, TPC and pilot fields of the DPCCH are offset relative to the DPDCHs power by P01, P02 and P03 dB respectively. SIR target floor value can be a function of P03 and is denoted as "SIRT_Floor". It is expected that UE may hit the floor of SIR target if all downlink data are decoded correctly, and can remain at floor value as long as there is no more data to be transmitted on power controlled downlink channels (i.e. dormancy mode is activated). In HSUPA, however, and as stated in 3GPP 25.214, the HSUPA downlink channels can be power controlled following the power control commands sent by the UE to the NodeB. Therefore, if the SIRT is continuously set at the floor level, the HUSPA downlink channels can be transmitted at a low power, which may result in higher missed detection or false alarms on E-AGCH, E-HICH and E-RGCH channels. As such, in an aspect, UE 10 may increase the SIR target floor in the presence of HSUPA operation, using various methods, preventing the target floor from being set at too low of a value. For example, UE 10 may increase the SIR target floor according to the following equation:

$$\text{SIR Target Floor} = \text{"SIRT\_Floor"} + \Delta_{hsupa}, \quad \text{(i)}$$

where $\Delta_{hsupa}$ is an offset that can pump up the floor value during downlink inactivity relative to the existing floor threshold "SIRT_Floor." Alternatively, in yet another aspect, UE 10 may increase the SIR target floor to use an absolute value as follows:

$$\text{SIR Target Floor} = \text{MAX}(\text{"SIRT\_Floor"}, \beta_{hsupa}), \quad \text{(ii)}$$

where the $\beta_{hsupa}$ is an absolute floor value which NodeB can set to achieve a reliable HSUPA downlink channel transmission with lower power. The SIR target floor in equations (i) and (ii) can be used when an uplink is inactive and there are actual data transmissions, otherwise, it will be efficient to maintain the actual "SIRT_Floor" in legacy operation.

Figure 4:
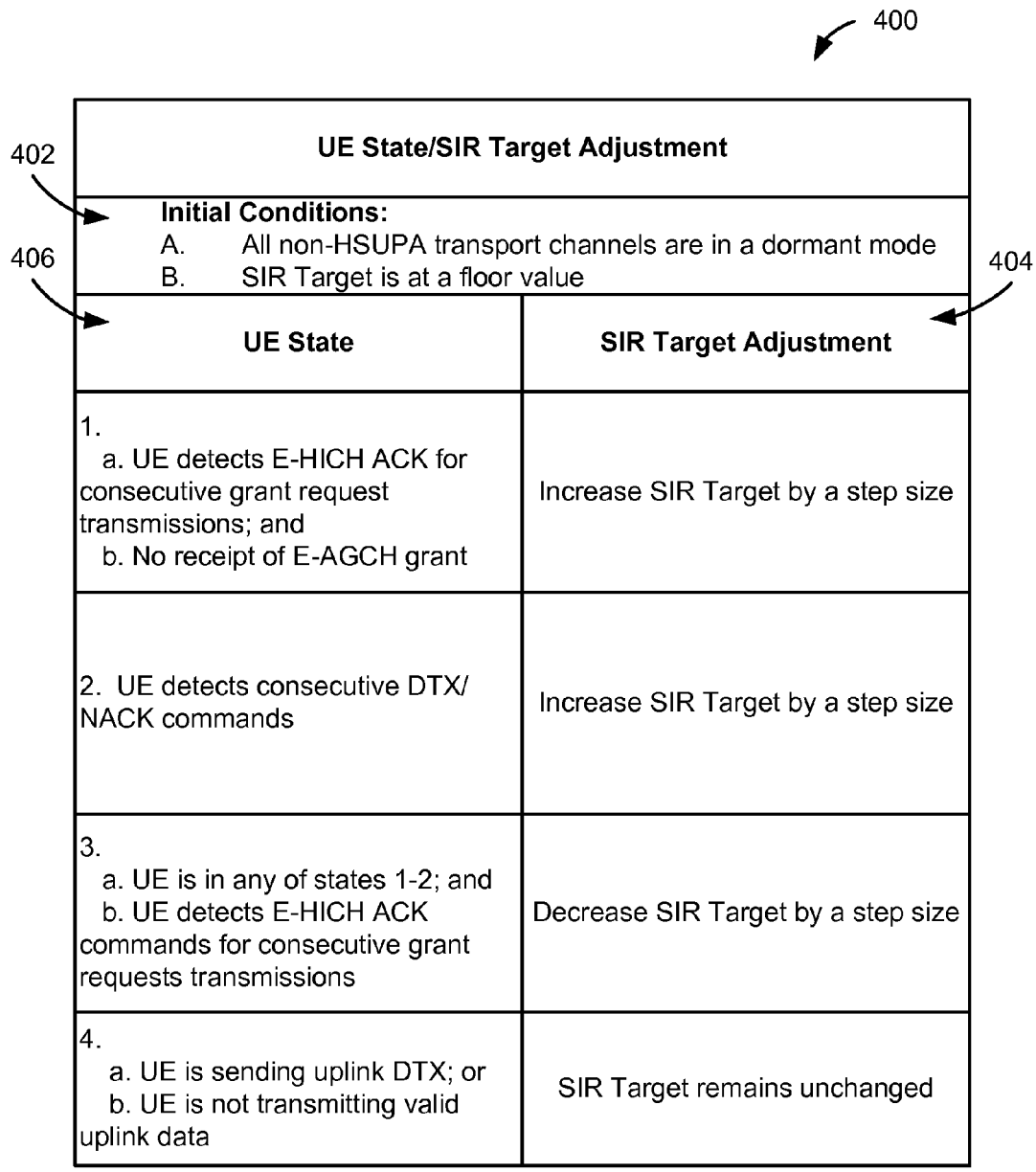
FIG. 4 is an exemplary chart illustrating a user's equipment state and a power control adjustment function in accordance with another aspect.

Turning now to FIG. 4, illustrated is an exemplary chart 400 illustrating various UE states and SIR target adjustments. In an aspect, UE 10 may dynamically increase the SIR target when UE 10 anticipates a need for extra network power on downlink 16 (FIG. 1) or decrease the SIR target when UE 10 anticipates that too much network power is being used on downlink 16. For example, UE 10 may anticipate performance issues during transmissions from base station 14 where extra power may be necessary, e.g. UE 10 missing an acceptance or denial of a requested grant from base station 14, UE 10 not receiving ACKs or NACKs from base station 14 regarding data transmissions or UE 10 being unhappy with the grant received from base station 14, among other performance issues. Further, dynamically adjusting the SIR target may prevent unnecessarily setting the SIR target at a high value allowing the network to save power.

In an aspect, based on detecting initial conditions 402, UE 10 via execution of outer loop power control module 18 (FIG. 1) may dynamically make a SIR target adjustment 404 based upon a determined UE state 406. Referring to FIG. 4, the initial conditions 402 may include, for example, when (A) all non-HSUPA transport channels are in a dormant mode and (B) when the SIR target is equal to a floor value. Thus, after all non-HSUPA transport channels are in a dormant mode and when the SIR target is equal to a floor value, UE 10 may dynamically adjust the SIR target based upon a state of UE 10, as discussed below. The SIR target floor value may increase or decrease based upon the amount of power necessary during transmissions between base station 14 and UE 10.

UE 10 may maintain two SIR target values. The first SIR target may be referred to as "Legacy SIRT." The legacy SIR target is described in U.S. Pat. No. 6,748,234, which is assigned to the assignee hereof, and which is hereby incorporated by reference herein. The increment and decrement of the legacy SIR target and its steps sizes is described in the patent. The second SIR target may be referred to as Enhanced Uplink SIR Target or "EUL_SIRT" or EUL_SIR target.

The final SIR target which will be used in Outer Loop control by the physical layer may be set as follows:

$$\text{OLPC SIR Target} = \text{MAX}(\text{Legacy SIRT}, \text{EUL\_SIRT}). \quad \text{(iii)}$$

During the first valid uplink transmission (i.e. the first data transmitted in the uplink after configuring HSUPA operation), set an initial EUL_SIRT to the current value of the Legacy_SIRT, if the transmission is the first HSUPA transmission.

The following method describes how to increment and decrement the EUL_SIR target during subsequent valid uplink transmissions and uplink discontinuous transmissions.

In an aspect, UE 10 may include logic that anticipates that the power level of the downlink transmissions for providing grant requests, e.g. E-AGCH, from base station 14, is decreasing, causing UE 10 to miss the grant transmitted from base station 14. For example, in UE states 1(a)-(b). In accordance with this aspect, the SIR target used for HSUPA "EUL_SIRT" may be modified as follows. If UE 10 detects E-HICH ACK for consecutive E-DCH Transport Format Combination Identifier (E-TFCI)=0 transmissions and UE 10 does not decode a valid E-AGCH, then increment EUL_SIR target by one step size.

In an aspect, UE 10 may include logic that anticipates that the transmission power from base station 14 is decreasing or is low when UE 10 transmits data on the uplink without receiving an acknowledgement from base station 14 for a period of time. In accordance with this aspect, the SIR target used for HSUPA "EUL_SIRT" may be modified as follows. If UE 10 detects consecutive E-HICH NACK and/or DTX from the Serving Radio Link, then increment EUL_SIR target by one step size.

Alternatively, UE 10 may include logic to decrease the SIR target value to prevent the network from using unnecessary power during the transmission. For example, in UE states 3(a)-(b), the SIR target used for HSUPA "EUL_SIRT" may be modified as follows. If UE 10 detects E-HICH ACK for consecutive uplink transmissions from the serving radio link, then decrement EUL_SIR target by one step size.

In an aspect, UE 10 may not want to change the SIR target value. Thus, the SIR target used for HSUPA "EUL_SIRT" in accordance with this aspect may be modified as follows. If UE 10 is not transmitting valid uplink data transmissions during the TTI, then UE 10 includes logic so that the EUL_SIR target remains unchanged from the last saved value. This may put EUL_SIR target into a dormant mode.

Figure 5:
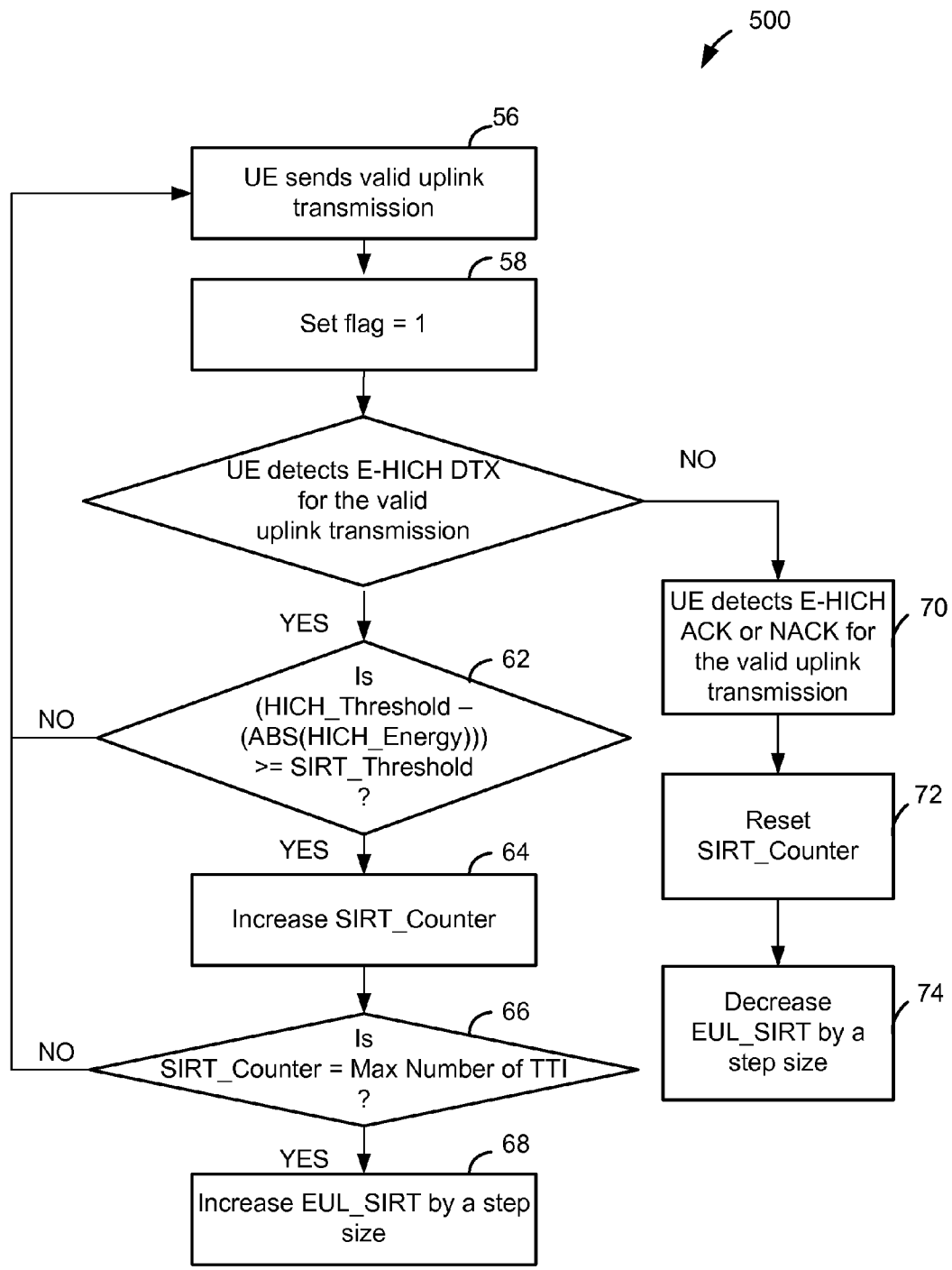
FIG. 5 is an exemplary flow chart illustrating a power control adjusting function in accordance with another aspect.

Referring now to FIG. 5, illustrated is a flow chart 500 of an exemplary power control adjusting function based upon the received E-HICH power from base station 14 (FIG. 1) in accordance with an aspect. UE 10 may include logic to anticipate that the E-HICH power level is decreasing based upon the decoded power of the E-HICH when UE 10 receives incorrect acknowledgements from base station 14 after transmitting valid uplink transmission data. In an aspect, the feedback transmitted on the E-HICH may be spread out for more reliability and for accumulating more energy. For example, the ACK, NACK or DTX, may be spread over forty slots allowing for more reliability during the transmission over the network.

In a specific aspect, an advanced algorithm of setting a SIR Target can be implemented to anticipate when the Ec/Ior of the Enhanced Uplink (EUL) Downlink (DL) Channels has been reduced following a reduction of DL SIR Target. The E-HICH Downlink OLPC modifications for HSUPA channel detection can work as an indicator to inform the DL Power Control entity, e.g. the base station, of a required increase to the SIR Target settings to accommodate the power controlled EUL DL channels. This happens when the UE reduces the SIR Target based on non-EUL DL activities, which forces the network to reduce the Ec/Ior of the EUL DL Channels. Hence, the detection of the E-HICH will get affected. The following method describes the algorithm in detail. The algorithm can anticipate a need to increase the SIR target and hence inform the network to increase the EUL DL channel power. Using this mechanism, if UE sends a valid uplink transmission and is waiting for an E-HICH ACK or NACK for the transmission, but instead, the UE detects an E-HICH DTX (e.g. due to the reduction of the E-HICH power following the reduction of SIR Target set by UE), then UE should increase the SIR Target. The DTX detection is different than mentioned above because such detection depends on the energy and threshold detection mechanism used for the E-HICH indicator channel. In particular, when the E-HICH energy is very close to a threshold energy level in the TTI in which the UE is expecting either an ACK or NACK, then the detected E-HICH energy indicates a possible drop in DL Channel power (Ec/Ior). In this case, an increase of SIR Target by UE will increase the power of the DL channels.

Referring now to flow chart 500, at step 56, UE 10 transmits valid uplink data, e.g. any type of data without generating an uplink DTX. At step 58, after UE 10 transmits the valid uplink data, a flag is set equal to 1 and UE 10 waits for a corresponding E-HICH command, e.g. ACK or NACK, from base station 14 indicating if the uplink transmission is decoded correctly by base station 14. Next, at step 60, if UE 10 detects an E-HICH DTX from base station 14, then the flow continues to step 62. At step 62, UE 10 compares the difference between a HICH_Threshold and the decoded energy from the E-HICH channel (e.g. absolute value of the HICH energy, or ABS(HICH_Energy) with a SIR target threshold (SIRT_Threshold).

In an aspect, the HICH_Threshold may be a threshold computed by UE 10 based on the channel conditions of the downlink channels, such as the Primary-Common Pilot Channel (P-CPICH) Received Signal Strength Indicator (RSSI). For example, the HICH_Threshold may be a range where at the lower end of the range, the decoded energy received from the E-HICH channel may be interpreted as a NACK. Further, at the upper end of the range, the decoded energy received from the E-HICH channel may be interpreted as an ACK, while at the middle of the range, the decoded energy received from the E-HICH channel may be interpreted as a DTX. In an aspect, the HICH_Energy may be the E-HICH energy detected or decoded by UE 10 during a downlink transmission from base station 14. The SIR target threshold may be set, for example, by testing E-HICH detection under various power values, e.g. Ec/Ior, while keeping the channel conditions fixed, e.g. fixed HICH threshold.

UE may maintain two SIR target values. The first SIR target may be referred to as "Legacy SIRT". The legacy SIR target is described in U.S. Pat. No. 6,748,234, which is assigned to the assignee hereof, and which is hereby incorporated by reference herein. The increment and decrement of the legacy SIR target and its step size is described in the patent. The second SIR target may be referred to as "EUL_SIRT" or "EUL_SIR target."

The final SIR target which will be used in Outer Loop control may be set as follows:

OLPC SIR Target=MAX(Legacy SIRT,EUL_SIRT).  (iv.)

The following method describes the increment and decrement of the EUL_SIR target.

During the first valid uplink transmission (i.e. the first data transmitted in the uplink after configuring HSUPA operation), set the initial EUL_SIRT to the current value of the Legacy_SIRT.

During any subsequent valid uplink transmission (i.e. UE transmits HSUPA data on uplink including E-DPCCH only transmissions) if UE detects E-HICH DTX on the downlink and if the difference of HICH_Threshold and HICH-Energy is less than the SIR target threshold, then the method may repeat for the next uplink transmission at step 56.

At 64, during any upcoming valid uplink transmission (i.e. UE transmits HSUPA data on uplink including E-DPCCH only transmissions) if UE detects E-HICH DTX on the downlink and if the difference is greater than or equal to the SIR target threshold, then the SIR target counter is increased by a positive value, which may be configurable based on the operator. The SIR target counter equals to TTI increment in milliseconds (i.e. each one increment will be 10 ms in 10 ms TTI HSUPA operation, and each increment will be 2 ms in 2 ms TTI HSUPA operation). The SIR target counter may be used to measure the persistence of the equality comparison.

Next, at step 66, the method determines if the target SIR counter increments reach the maximum pre-configured number of TTI (i.e. the maximum number of TTI which can indicate that the equality comparison is reliable), the target SIR counter may be configured by the operator of the system depending on how frequent this loop should be executed for.

If the target SIR counter does not reach the maximum pre-configured number of TTI, then the process may repeat from step 56.

At 68, if the SIR target counter reaches the maximum pre-configured number of TTI, then UE 10 increases the SIR target Enhanced Uplink (EUL_SIRT) by a step size and the SIR counter is reset. If the SIR counter expires, then the EUL_SIRT may be incremented by one step size.

The step size may be configured in a way to increase the efficiency of the HSUPA downlink channels without significantly increasing the power of other downlink dedicated channels.

During a subsequent valid uplink transmission (i.e. UE transmits HSUPA data on uplink including E-DPCCH only transmissions), at 70, if UE 10 receives E-HICH ACK or NACK, then, at 72, UE 10 resets SIR counter and, at 74, the EUL_SIRT is decreased by one step size.

Accordingly, the method 500 provides that when there is an E-HICH DTX and the E-HICH energy is very close to the threshold due to the reduction in E-HICH Ec/Ior, then the UE should increase the SIR Target to a level that will allow the network, e.g. base station or node B, to increase the Ec/Ior of all EUL DL channels.

Figure 6:
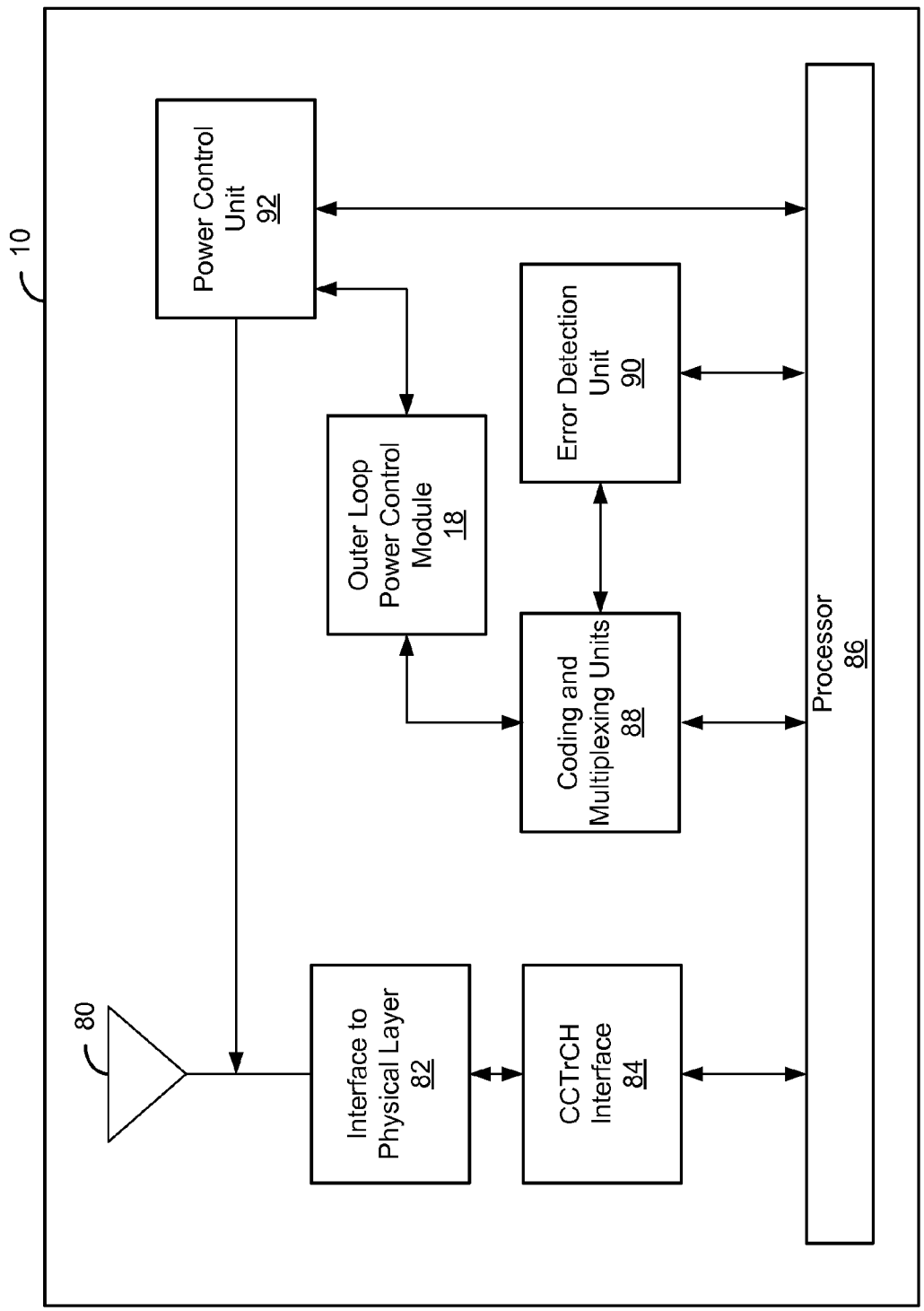
FIG. 6 is a schematic drawing of an exemplary user equipment device in accordance with yet another aspect.

Referring now to FIG. 6, illustrated is an exemplary UE 10 device in accordance with an aspect. UE 10 may include an antenna 80, coupled to an interface to the physical layer 82. In an aspect, UE 10 may include a CCTrCH interface 84 operable for processing the composite transport channel and coupled to interface 82, processor 86, and the coding and multiplexing units 88. Coding and multiplexing units 88 may process the data streams of the transport channel supported. In an aspect, coding and multiplexing units 88 may be coupled to an error detection unit 90 and processor 86. Further, coding and multiplexing units 88 operate in cooperation with power control unit 92 and outer loop power control module 18, which processes information according to the algorithms described herein for providing power control instructions to power control unit 92. The power control instructions are received by base station 14 (FIG. 1). In particular, power control unit 92 and/or outer loop power control module 18 may be coupled to antenna 64, thereby initiating transmissions of the signal to base station 14 (FIG. 1).

Figure 7:
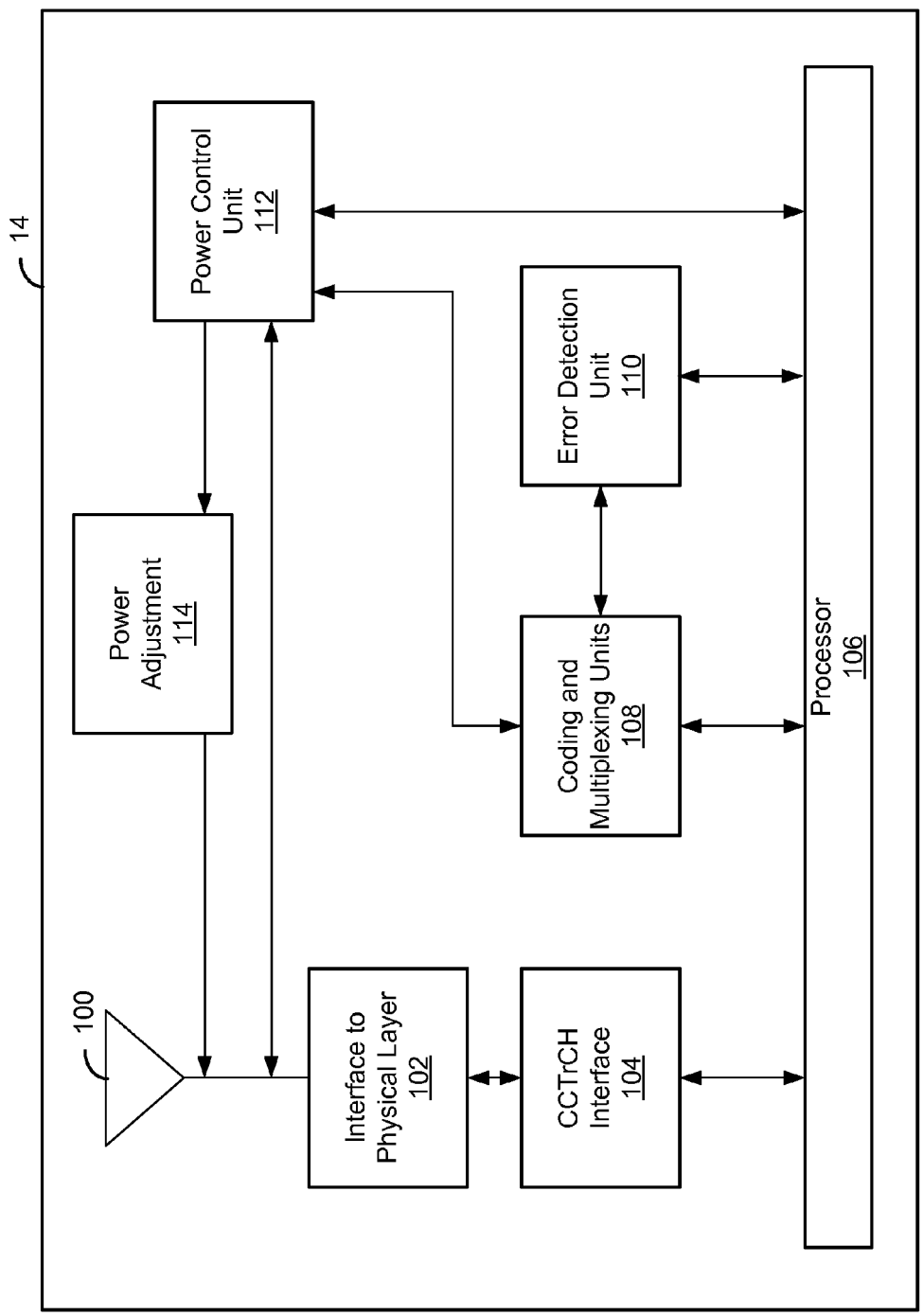
FIG. 7 is a schematic drawing of an exemplary base station device in accordance with an aspect.

Turning now to FIG. 7, illustrated is an exemplary base station 14 device in accordance with an aspect. Base station 14 may include an antenna 100, coupled to an interface to the physical layer 102. In an aspect, base station 14 may include a CCTrCH interface 104 operable for processing the composite transport channel coupled to interface 102, processor 106, and the coding and multiplexing units 108. Coding and multiplexing units 108 may process the data streams of the transport channel supported. In an aspect, coding and multiplexing units 108 may be coupled to an error detection unit 110 and processor 106. In an aspect, coding and multiplexing units 108 are operable for providing power control instructions to power control unit 112, wherein the power control instructions are received by UE 10 (FIG. 1). In an aspect, after receiving the power control instructions, power control unit 112 may transmit a power adjustment signal 114 to UE 10 (FIG. 1) operable for adjusting the transmission power.

Figure 8:
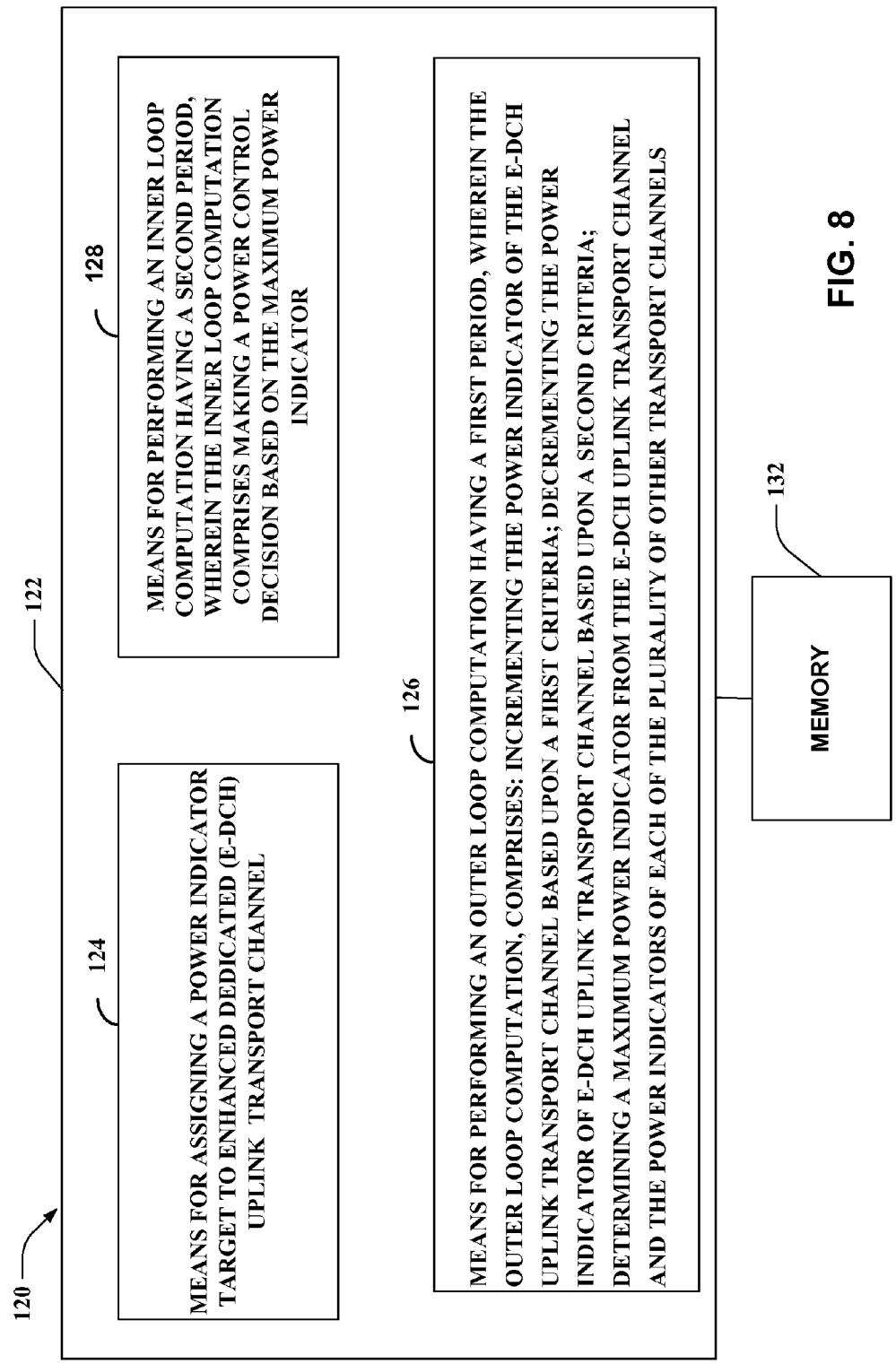
FIG. 8 is a schematic drawing of an example system that facilitates dynamically controlling a base station downlink transmission power to a UE.

Referring to FIG. 8, disclosed is one aspect of a system 120 configured to dynamically control a base station downlink transmission power to a user equipment (UE) in a High-Speed Uplink Packet Access (HSUPA) communication system. System 120 can reside within a multiplexer, transmitter, mobile device, user equipment, etc., for instance. As depicted, system 120 includes functional blocks that can represent functions implemented by a processor, software, or combination thereof (e.g., firmware). System 120 includes a logical grouping 122 of electrical components that facilitate dynamically controlling a base station downlink transmission power to a UE. Logical grouping 122 can include means 124 for assigning a power indicator target to enhanced dedicated (E-DCH) uplink transport channel. In addition, logical grouping 122 can include means 126 for performing an outer loop computation having a first period, wherein the outer loop computation, comprises: incrementing the power indicator of the E-DCH uplink transport channel based upon a first criteria; decrementing the power indicator of E-DCH uplink transport channel based upon a second criteria; determining a maximum power indicator from the E-DCH uplink transport channel and the power indicators of each of the plurality of other transport channels. Moreover, logical grouping 122 can include means 128 for performing an inner loop computation having a second period, wherein the inner loop computation comprises making a power control decision based on the maximum power indicator. Additionally, system 120 can include a memory 132 that retains instructions for executing functions associated with electrical components 124, 126 and 128. While shown as being external to memory 132, it is to be understood that electrical components 124, 126 and 128 can exist within memory 132.

Figure 9:
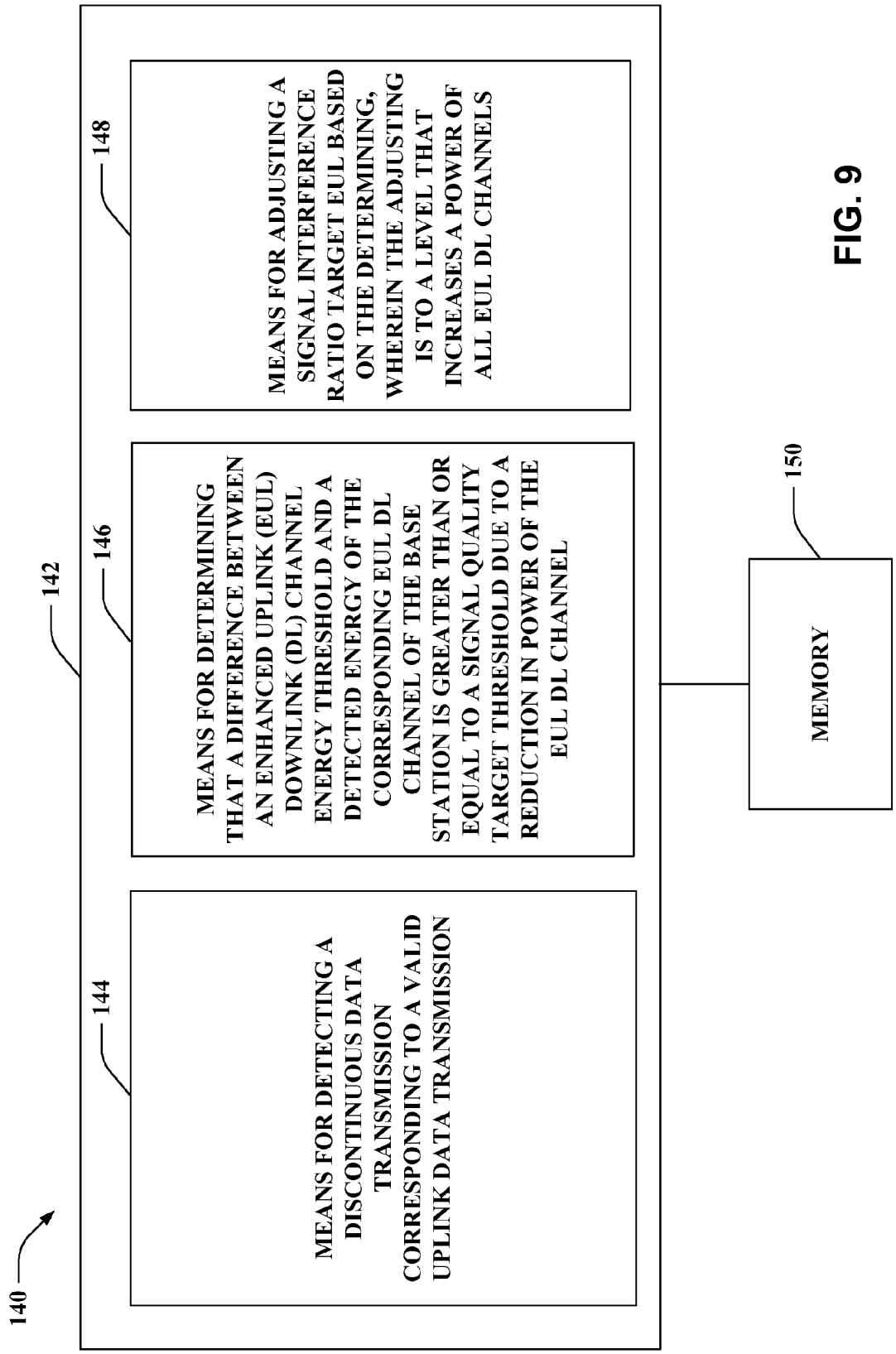
FIG. 9 is a schematic drawing of an example system that facilitates dynamically controlling a base station downlink transmission power to a UE.

Referring now to FIG. 9, disclosed is another aspect of a system 140 configured to dynamically control a base station downlink transmission power to a user equipment (UE) in a High-Speed Uplink Packet Access (HSUPA) communication system. System 140 can reside within a user equipment, multiplexer, transmitter, mobile device, etc., for instance. As depicted, system 140 includes functional blocks that can represent functions implemented by a processor, software, or combination thereof (e.g., firmware). System 140 includes a logical grouping 142 of electrical components that facilitate dynamically controlling a base station downlink transmission power to a UE. Logical grouping 142 can include means 144 for detecting a discontinuous data transmission corresponding to a valid uplink data transmission. In addition, logical grouping 142 can include means 146 for determining that a difference between an Enhanced Uplink (EUL) downlink (DL) channel energy threshold and a detected energy of the corresponding EUL DL channel of the base station is greater than or equal to a signal quality target threshold due to a reduction in power of the EUL DL channel. Moreover, logical grouping 142 can include means 148 for adjusting a signal interference ratio target EUL based on the determining, wherein the adjusting is to a level that increases a power of all EUL DL channels. Additionally, system 140 can include a memory 150 that retains instructions for executing functions associated with electrical components 144, 146 and 148. While shown as being external to memory 150, it is to be understood that electrical components 144, 146 and 148 can exist within memory 150.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for dynamically controlling a base station downlink transmission power to user equipment (UE) in a High-Speed Uplink Packet Access (HSUPA) communication system, comprising:
   assigning a power indicator target to enhanced dedicated (E-DCH) uplink transport channel;
   performing an outer loop computation having a first period, wherein the outer loop computation, comprises:
   incrementing the power indicator of the E-DCH uplink transport channel based upon a first criteria;
   decrementing the power indicator of E-DCH uplink transport channel based upon a second criteria;
   determining a maximum power indicator of each of a plurality of transport channels other than the E-DCH uplink transport channel;
   assigning a second power indicator target to the determined maximum power indicator;
   determining a maximum power indicator from the E-DCH uplink transport channel and the second power indicator target; and
   performing an inner loop computation having a second period, wherein the inner loop computation comprises making a power control decision based on the maximum power indicator.

2. The method of claim 1, wherein the E-DCH power indicator is an enhanced uplink signal-to-interference ratio (EUL_SIR) target.

3. The method of claim 2, wherein the EUL_SIR target has a floor value with respect to a floor value of the plurality of the other transport channels.

4. The method of claim 3, wherein the incrementing applies an increment step value, and the decrementing applies a decrement step value, wherein the decrement step value is similar or different from the increment step value.

5. The method of claim 4, wherein the increment and decrement step values apply a target false alarm or misdetection probability to the increment or the decrement step sizes.

6. The method of claim 4, further comprising:
   increasing the SIR target floor by the increment step value during downlink inactivity.

7. The method of claim 3, further comprising:
   changing from the floor value to an absolute floor value sufficient to achieve a reliable HSUPA downlink channel transmission.

8. The method of claim 1, wherein the first criteria comprises:
   detecting, by the UE, acknowledged (ACK) commands for consecutive grant request transmissions; and
   determining, by the UE, no receipt of an E-AGCH grant from the base station.

9. The method of claim 1, wherein the first criteria comprises:
   determining a number of consecutive discontinuous transmissions (DTX) or not acknowledged (NACK) commands corresponding to UE uplink transmissions.

10. The method of claim 1, wherein the second criteria comprises:
    determining a number of consecutive acknowledged (ACK) commands corresponding to UE grant request transmissions.

11. The method of claim 1, wherein incrementing the power indicator is not performed upon determining that the UE is sending uplink discontinuous transmissions (DTX).

12. The method of claim 1, wherein incrementing the power indicator is not performed upon determining that the UE is not transmitting valid uplink data.

13. At least one processor configured to dynamically control a base station downlink transmission power to user equipment (UE) in a High-Speed Uplink Packet Access (HSUPA) communication system, comprising:
    a first module for assigning a power indicator target to enhanced dedicated (E-DCH) uplink transport channel;
    a second module for performing an outer loop computation having a first period, wherein the outer loop computation, comprises:

incrementing the power indicator of the E-DCH uplink transport channel based upon a first criteria;

decrementing the power indicator of E-DCH uplink transport channel based upon a second criteria;

determining a maximum power indicator of each of a plurality of a transport channels other than the E-DCH uplink transport channel;

assigning a second power indicator target to the determined maximum power indicator;

determining a maximum power indicator from the E-DCH uplink transport channel and the second power indicator target; and a third module for performing an inner loop computation having a second period, wherein the inner loop computation comprises making a power control decision based on the maximum power indicator.

14. A computer program product configured to dynamically control a base station downlink transmission power to user equipment (UE) in a High-Speed Uplink Packet Access (HSUPA) communication system, comprising:

a non-transitory computer-readable medium comprising:

at least one instruction for causing a computer to assign a power indicator target to enhanced dedicated (E-DCH) uplink transport channel;

at least one instruction for causing a computer to perform an outer loop computation having a first period, wherein the outer loop computation, comprises:

incrementing the power indicator of the E-DCH uplink transport channel based upon a first criteria;

decrementing the power indicator of E-DCH uplink transport channel based upon a second criteria;

determining a maximum power indicator of each of a plurality of transport channels other than the E-DCH uplink transport channel;

assigning a second power indicator target to the determined maximum power indicator;

determining a maximum power indicator from the E-DCH uplink transport channel and the second power indicator target; and at least one instruction for causing a computer to perform an inner loop computation having a second period, wherein the inner loop computation comprises making a power control decision based on the maximum power indicator.

15. An apparatus for dynamically controlling a base station downlink transmission power to user equipment (UE) in a High-Speed Uplink Packet Access (HSUPA) communication system, comprising:

means for assigning a power indicator target to enhanced dedicated (E-DCH) uplink transport channel;

means for performing an outer loop computation having a first period, wherein the outer loop computation, comprises:

incrementing the power indicator of the E-DCH uplink transport channel based upon a first criteria;

decrementing the power indicator of E-DCH uplink transport channel based upon a second criteria;

determining a maximum power indicator of each of a plurality of transport channels other than the E-DCH uplink transport channel;

assigning a second power indicator target to the determined maximum power indicator;

determining a maximum power indicator from the E-DCH uplink transport channel and the second power indicator target; and means for performing an inner loop computation having a second period, wherein the inner loop computation comprises making a power control decision based on the maximum power indicator.

16. An apparatus for dynamically controlling a base station downlink transmission power to user equipment (UE) in a High-Speed Uplink Packet Access (HSUPA) communication system, comprising:

a memory comprising a plurality of instructions, including instructions for assigning a power indicator target to enhanced dedicated (E-DCH) uplink transport channel, instructions for performing an outer loop computation having a first period, wherein the outer loop computation, comprises incrementing the power indicator of the E-DCH uplink transport channel based upon a first criteria, decrementing the power indicator of E-DCH uplink transport channel based upon a second criteria, determining a maximum power indicator of each of a plurality of transport channels other than the E-DCH uplink transport channel, assigning a second power indicator target to the determined maximum power indicator, determining a maximum power indicator from the E-DCH uplink transport channel and the second power indicator target, and instructions for performing an inner loop computation having a second period, wherein the inner loop computation comprises making a power control decision based on the maximum power indicator; and a processor in communication with the memory and operable to execute the plurality of instructions.

17. The apparatus of claim 16, wherein the E-DCH power indicator is an enhanced uplink signal-to-interference ratio (EUL_SIR) target.

18. The apparatus of claim 17, wherein the EUL_SIR target has a floor value with respect to a floor value of the plurality of the other transport channels.

19. The apparatus of claim 18, wherein the incrementing applies an increment step value, and the decrementing applies a decrement step value, wherein the decrement step value is similar or different from the increment step value.

20. The apparatus of claim 19, wherein the increment and decrement step values apply a target false alarm or misdetection probability to the increment or the decrement step sizes.

21. The apparatus of claim 19, further comprising:

instructions for increasing the SIR target floor by an offset the increment step value during downlink inactivity.

22. The apparatus of claim 18, further comprising:

instructions for hanging from the floor value to an absolute floor value sufficient to achieve a reliable HSUPA downlink channel transmission.

23. The apparatus of claim 16, wherein the first criteria comprises:

instructions for detecting, by the UE, acknowledged (ACK) commands for consecutive grant request transmissions; and instructions for determining, by the UE, no receipt of an E-AGCH grant from the base station.

24. The apparatus of claim 16, wherein the first criteria comprises:

instructions for determining a number of consecutive discontinuous transmissions (DTX) or not acknowledged (NACK) commands corresponding to UE uplink transmissions.

25. The apparatus of claim 16, wherein the second criteria comprises:
  instructions for determining a number of consecutive acknowledged (ACK) commands corresponding to UE grant request transmissions.

26. The apparatus of claim 16, wherein incrementing the power indicator is not performed upon determining that the UE is sending uplink discontinuous transmissions (DTX).

27. The apparatus of claim 16, wherein incrementing the power indicator is not performed upon determining that the UE is not transmitting valid uplink data.

28. A method for dynamically controlling a base station downlink transmission power to a user equipment (UE) in a High-Speed Uplink Packet Access (HSUPA) communication system, comprising:
  sending, from the UE to a base station, a valid uplink data transmission;
  detecting a discontinuous data transmission in response to the valid uplink data transmission;
  determining that a difference between an Enhanced Uplink (EUL) downlink (DL) channel energy threshold and a detected energy of the corresponding EUL DL channel of the base station is greater than or equal to a signal quality target threshold due to a reduction in power of the EUL DL channel; and
  adjusting a signal interference ratio target EUL based on the determining, wherein the adjusting is to a level that increases a power of all EUL DL channels.

29. The method of claim 28,
  wherein the determining further comprises determining the difference between a HICH channel energy threshold and a detected energy of the HICH channel is greater than or equal to a signal-to-interference (SIR) target threshold;
  wherein the method further comprises increasing a counter to a new counter value if the difference is greater than or equal to the SIR target threshold; and
  wherein the adjusting comprises increasing a EUL_SIR target by a value if the new counter value equals a predetermined SIR threshold counter value.

30. The method of claim 28, further comprising:
  detecting an acknowledged (ACK) command or not acknowledged (NACK) commands corresponding to a valid uplink data transmission;
  resetting the counter value to zero; and
  wherein decreasing the EUL_SIR target by a value if the new counter value equals zero.

31. At least one processor configured for dynamically controlling a base station downlink transmission power to a user equipment (UE) in a High-Speed Uplink Packet Access (HSUPA) communication system, comprising:
  a first module for sending, from the UE to a base station, a valid uplink data transmission;
  a second module for detecting a discontinuous data transmission in response to the valid uplink data transmission;
  a third module for determining that a difference between an Enhanced Uplink (EUL) downlink (DL) channel energy threshold and a detected energy of the corresponding EUL DL channel of the base station is greater than or equal to a signal quality target threshold due to a reduction in power of the EUL DL channel; and
  a fourth module for adjusting a signal interference ratio target EUL based on the determining, wherein the adjusting is to a level that increases a power of all EUL DL channels.

32. The at least one processor of claim 31,
  wherein the third module is further for determining the difference between a HICH channel energy threshold and a detected energy of the HICH channel is greater than or equal to a signal-to-interference (SIR) target threshold;
  wherein the at least one processor further comprises a fifth module for increasing a counter to a new counter value if the difference is greater than or equal to the SIR target threshold; and
  wherein the fourth module is further operable for adjusting the EUL_SIR target by a value if the new counter value equals a predetermined SIR threshold counter value.

33. A computer program product configured to dynamically control a base station downlink transmission power to a user equipment (UE) in a High-Speed Uplink Packet Access (HSUPA) communication system, comprising:
  a non-transitory computer-readable medium comprising:
    at least one instruction operable to cause the computer to send, from the UE to a base station, a valid uplink data transmission;
    at least one instruction operable to cause a computer to detect a discontinuous data transmission in response to the valid uplink data transmission;
    at least one instruction operable to cause the computer to determine that a difference between an Enhanced Uplink (EUL) downlink (DL) channel energy threshold and a detected energy of the corresponding EUL DL channel of the base station is greater than or equal to a signal quality target threshold due to a reduction in power of the EUL DL channel; and
    at least one instruction operable to cause the computer to adjust a signal interference ratio target EUL based on the determining, wherein the adjusting is to a level that increases a power of all EUL DL channels.

34. The computer program product of claim 33, wherein the at least one instruction operable to cause the computer to determine further comprises determining the difference between a HICH channel energy threshold and a detected energy of the HICH channel is greater than or equal to a signal-to-interference (SIR) target threshold;
  wherein the non-transitory computer-readable medium further comprises at least one instruction operable to cause the computer to increase a counter to a new counter value if the difference is greater than or equal to the SIR target threshold; and
  wherein the at least one instruction operable to cause the computer to adjust further comprises at least one instruction operable to adjust the EUL_SIR target by a value if the new counter value equals a predetermined SIR threshold counter value.

35. An apparatus configured for dynamically controlling a base station downlink transmission power to a user equipment (UE) in a High-Speed Uplink Packet Access (HSUPA) communication system, comprising:
  means for sending, from the UE to a base station, a valid uplink data transmission;
  means for detecting a discontinuous data transmission in response to the valid uplink data transmission;
  means for determining that a difference between an Enhanced Uplink (EUL) downlink (DL) channel energy threshold and a detected energy of the corresponding EUL DL channel of the base station is greater than or equal to a signal quality target threshold due to a reduction in power of the EUL DL channel; and means for adjusting a signal interference ratio target EUL based on the determining, wherein the adjusting is to a level that increases a power of all EUL DL channels.

36. The apparatus of claim 35,
wherein the means for determining further comprises means for determining the difference between a HICH channel energy threshold and a detected energy of the HICH channel is greater than or equal to a signal-to-interference (SIR) target threshold;
wherein the apparatus further comprises means for increasing a counter to a new counter value if the difference is greater than or equal to the SIR target threshold; and
wherein the means for adjusting the EUL_SIR target by a value comprises means for adjusting the EUL_SIR target if the new counter value equals a predetermined SIR threshold counter value.

37. An apparatus for dynamically controlling a base station downlink transmission power to a user equipment (UE) in a High-Speed Uplink Packet Access (HSUPA) communication system, comprising:
a memory comprising a plurality of instructions, including instructions for sending, from the UE to a base station, a valid uplink data transmission, detecting a discontinuous data transmission in response to the valid uplink data transmission, instructions for determining that a difference between an Enhanced Uplink (EUL) downlink (DL) channel energy threshold and a detected energy of the corresponding EUL DL channel of the base station is greater than or equal to a signal quality target threshold due to a reduction in power of the EUL DL channel, and instructions for adjusting a signal interference ratio target EUL based on the determining, wherein the adjusting is to a level that increases a power of all EUL DL channels; and
a processor in communication with the memory and operable to execute the plurality of instructions.

38. The apparatus of claim 37,
wherein the instructions for determining further comprise instructions for determining the difference between a HICH channel energy threshold and a detected energy of the HICH channel is greater than or equal to a signal-to-interference (SIR) target threshold;
wherein the memory further comprises instructions for increasing a counter to a new counter value if the difference is greater than or equal to the SIR target threshold; and
wherein the instructions for increasing the EUL_SIR target further comprise instructions for increasing the EUL_SIR target by a value if the new counter value equals a predetermined SIR threshold counter value.

39. The apparatus of claim 37, further comprising: instructions for detecting an acknowledged (ACK) command or not acknowledged (NACK) commands corresponding to a valid uplink data transmission;
instructions for resetting the counter value to zero; and
instructions for decreasing the EUL_SIR target by a value if the new counter value equals zero.

40. A method for dynamically controlling a base station downlink transmission power to a user equipment (UE) in a High-Speed Uplink Packet Access (HSUPA) communication system, comprising:
sending, from the UE to a base station, valid uplink data transmission;
detecting a discontinuous data transmission corresponding to a valid uplink data transmission;
determining that a difference between an Enhanced Uplink (EUL) downlink (DL) channel energy threshold and a detected energy of the corresponding EUL DL channel of the base station is greater than or equal to a signal quality target threshold due to a reduction in power of the EUL DL channel, wherein the determining further comprises determining the difference between a HICH channel energy threshold and a detected energy of the HICH channel is greater than or equal to a signal-to-interference (SIR) target threshold;
adjusting a signal interference ratio target EUL based on the determining, wherein the adjusting is to a level that increases a power of all EUL DL channels; and
increasing a counter to a new counter value if the difference is greater than or equal to the SIR target threshold, and
wherein the adjusting comprises increasing a EUL_SIR target by a value if the new counter value equals a predetermined SIR threshold counter value.

41. A method for dynamically controlling a base station downlink transmission power to a user equipment (UE) in a High-Speed Uplink Packet Access (HSUPA) communication system, comprising:
detecting a discontinuous data transmission corresponding to a valid uplink data transmission;
determining that a difference between an Enhanced Uplink (EUL) downlink (DL) channel energy threshold and a detected energy of the corresponding EUL DL channel of the base station is greater than or equal to a signal quality target threshold due to a reduction in power of the EUL DL channel;
adjusting a signal interference ratio target EUL based on the determining, wherein the adjusting is to a level that increases a power of all EUL DL channels;
detecting an acknowledged (ACK) command or not acknowledged (NACK) commands corresponding to a valid uplink data transmission; and
resetting the counter value to zero, wherein decreasing the EUL_SIR target by a value if the new counter value equals zero.

42. An apparatus for dynamically controlling a base station downlink transmission power to a user equipment (UE) in a High-Speed Uplink Packet Access (HSUPA) communication system, comprising:
a memory comprising a plurality of instructions, including instructions for sending, from the UE to a base station, valid uplink data transmission, detecting a discontinuous data transmission corresponding to a valid uplink data transmission, instructions for determining that a difference between an Enhanced Uplink (EUL) downlink (DL) channel energy threshold and a detected energy of the corresponding EUL DL channel of the base station is greater than or equal to a signal quality target threshold due to a reduction in power of the EUL DL channel, wherein the instructions for determining further comprise instructions for determining the difference between a HICH channel energy threshold and a detected energy of the HICH channel is greater than or equal to a signal-to-interference (SIR) target threshold, instructions for adjusting a signal interference ratio target EUL based on the determining, wherein the adjusting is to a level that increases a power of all EUL DL channels, and instructions for increasing a counter to a new counter value if the difference is greater than or equal to the SIR target threshold, wherein the instructions for increasing the EUL_SIR target further comprise instructions for increasing the EUL_SIR target by a value if the new counter value equals a predetermined SIR threshold counter value; and a processor in communication with the memory and operable to execute the plurality of instructions.

43. An apparatus for dynamically controlling a base station downlink transmission power to a user equipment (UE) in a High-Speed Uplink Packet Access (HSUPA) communication system, comprising:
- a memory comprising a plurality of instructions, including instructions for detecting a discontinuous data transmission corresponding to a valid uplink data transmission, instructions for determining that a difference between an Enhanced Uplink (EUL) downlink (DL) channel energy threshold and a detected energy of the corresponding EUL DL channel of the base station is greater than or equal to a signal quality target threshold due to a reduction in power of the EUL DL channel, instructions for adjusting a signal interference ratio target EUL based on the determining, wherein the adjusting is to a level that increases a power of all EUL DL channels, instructions for detecting an acknowledged (ACK) command or not acknowledged (NACK) commands corresponding to a valid uplink data transmission, instructions for resetting the counter value to zero, and instructions for decreasing the EUL_SIR target by a value if the new counter value equals zero; and
- a processor in communication with the memory and operable to execute the plurality of instructions.

\* \* \* \* \*